May 8, 1962     J. W. DOWNS     3,034,049
MUZZLE VELOCITY CHRONOGRAPH

Filed March 16, 1955     2 Sheets-Sheet 1

INVENTOR
JOHN W. DOWNS
BY
ATTORNEY

May 8, 1962  J. W. DOWNS  3,034,049
MUZZLE VELOCITY CHRONOGRAPH
Filed March 16, 1955  2 Sheets-Sheet 2

INVENTOR
JOHN W. DOWNS
BY
ATTORNEY

United States Patent Office 3,034,049
Patented May 8, 1962

3,034,049
MUZZLE VELOCITY CHRONOGRAPH
John W. Downs, Glen Cove, N.Y., assignor to Sperry Rand Corporation, a corporation of Delaware
Filed Mar. 16, 1955, Ser. No. 494,782
15 Claims. (Cl. 324—70)

This invention relates to a Doppler-type chronograph for measuring projectile velocities, and, more particularly, is concerned with a chronograph including a computer for giving true muzzle velocity of an artillary piece.

In application S.N. 250,887, filed on October 11, 1951, in the name of John W. Downs, and now Patent No. 2,751,593, there is described a Doppler-type chronograph which measures the velocity of a projectile a predetermined time interval after it is fired from a gun. The reason for delaying the velocity measurement is to permit the flash gases to dissipate, since the flash gases obscure the projectile, preventing the reflection of the Doppler radar signal by the projectile. While the chronograph therein described is highly satisfactory in operation and gives extremely accurate velocity measurements, the resulting measurement is not a true muzzle velocity but is the velocity measured at some distance from the gun. Since all gun sighting computers are set up to receive velocity information in the form of muzzle velocity, it is necessary to apply a correcting factor to the velocity readings obtained from the chronograph described in the above-mentioned copending application. The correction to be added, however, depends on many factors including the weight of the projectile, the size and form of the projectile, the propellant used, the density of the air, the temperature of the air, and the elevation of the gun. If the correction factor were computed and tabulated for a number of different guns for varying conditions of the above factors, it is evident that the tabulated data would be complex, bulky, and a nuisance to use.

It is the general object of this invention to avoid and overcome the foregoing and other difficulties of and objections to the prior art practices by the provision of an improved Doppler chronograph which indicates the true muzzle velocity of the projectile of any gun regardless of the above-enumerated factors affecting the trajectory of the projectile.

Another object of this invention is the provision of a Doppler-type chronograph which measures the projectile velocity after a period of time sufficient to permit the dissipation of the flash gases.

Another object of this invention is to provide a chronograph including a computer which automatically computes the muzzle velocity from velocity measurements taken at fixed time intervals after the firing of the gun.

These and other objects of the invention which will become apparent as the description proceeds are achieved by the provision of apparatus including transmitter-receiver means for producing a train of Doppler pulses at a repetition frequency proportional to the projectile velocity. The Doppler pulses are gated during a fixed time interval to a decimal counter, the center of the first interval occurring at a predetermined time interval $T_1$ after the gun is fired. During the same fixed interval the Doppler pulses are also gated to a bidirectional counter. The Doppler pulses are gated during a second time interval to the reverse count input of the bidirectional counter, the center of this second interval occuring at a predetermined time interval $T_2$ after the gun is fired. The resulting count on the bidirectional counter after the second interval is equal to the difference between the number of Doppler pulses, i.e., the velocity, during the first interval, and the number of Doppler pulses, i.e., the velocity, during the second interval. A pulse source is then coupled to the reverse count input of the bidirectional counter through a pulse divider circuit, which divides the number of pulses according to the ratio $T_1/T_2$. The pulse source is also connected to the decimal counter. When the bidirectional counter is brought back to its zero condition, it cuts off the corrective pulses from the pulse source to the decimal counter. The resulting indication on the decimal counter is the true muzzle velocity.

For a better understanding of the invention, reference should be had to the accompanying drawings, wherein.

Figure 1:
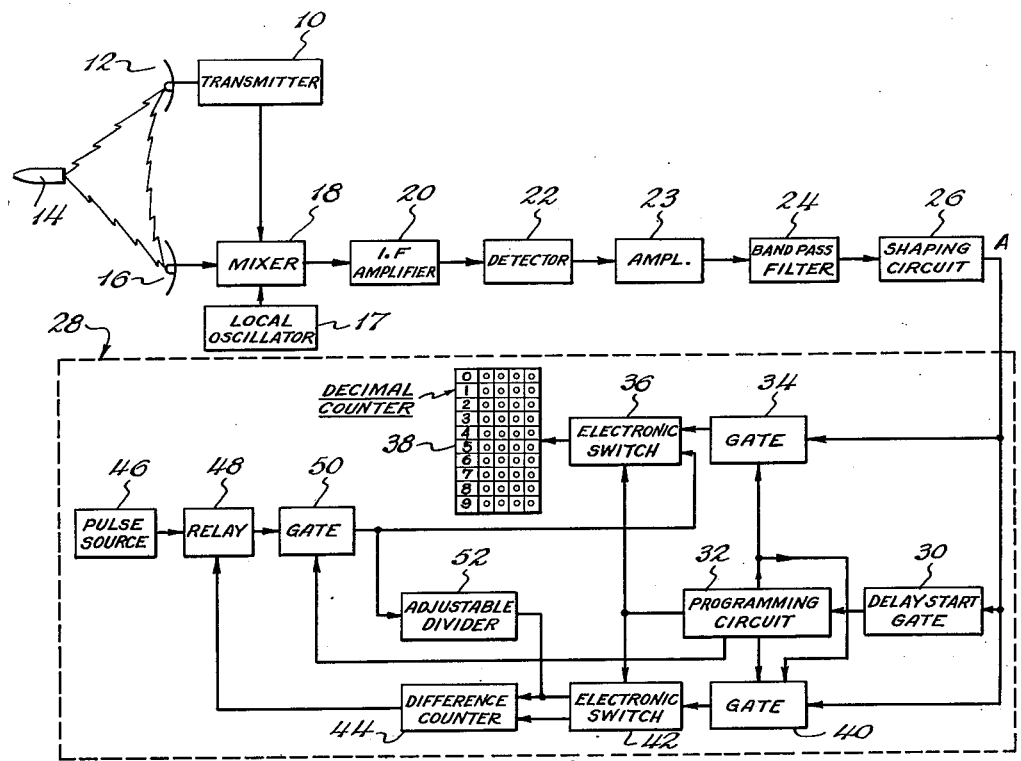
FIG. 1 is a block diagram of a complete chronograph circuit including the computer.

With particular reference to the form of the invention illuustrated in FIG. 1, the numeral 10 indicates generally a high frequency radio transmitter, the output of which is coupled to an antenna 12. The transmitter is preferably designed to generate a carrier signal having a frequency of 10,000 megacycles. The transmitting antenna 12 is so positioned relative to a gun (not shown) whose muzzle velocity is being measured that as a projectile 14 emerges from the gun, the transmitted signal is reflected therefrom back to a receiving antenna 16. The transmitting antenna 12 and receiving antenna 16 are preferably mounted adjacent each other.

The frequency of the reflected signal is shifted in accordance with the Doppler principle by an amount proportional to the velocity of the projectile 14. The signal received at the antenna 16 is of a frequency of 10,000 − $f_d$ megacycles, where $f_d$ is the Doppler frequency shift. In addition, there is a small leakage signal of 10,000 megacycles from the transmitting antenna 12 at the receiving antenna 16.

The signal at the receiving antenna is mixed with a signal of 9,966 megacycles from a local oscillator 17. The receiver input signal and the local oscillator signal are heterodyned in the mixer circuit 18 in conventional manner characteristic of the superheterodyne-type receiver to produce an intermediate frequency having a 34 megacycle component, a 34+$f_d$ megacycle component, and a 34−$f_d$ megacycle component. It will be appreciated that the intermediate frequency signal is essentially a carrier signal of 34 megacycles modulated by the Doppler frequency of $f_d$. The intermediate frequency signal is amplified by suitable amplifying means 20 and applied to an amplitude modulation detector 22, the output signal of which is the Doppler signal having a frequency of $f_d$.

The Doppler signal at the output of the detector 22 is amplified at 23 and applied to a band pass filter 24 designed to pass frequencies of the order of 38 to 84 kilocycles and to reduce spurious noise signals outside this frequency range, thus eliminating Doppler cycles due to moving objects other than the projectile and also suppressing inherent noise pulses. A filtered sine wave signal is then shaped into pulses by means of a shaping circuit 26 to trigger a computer indicated generally at 28.

Figure 3:
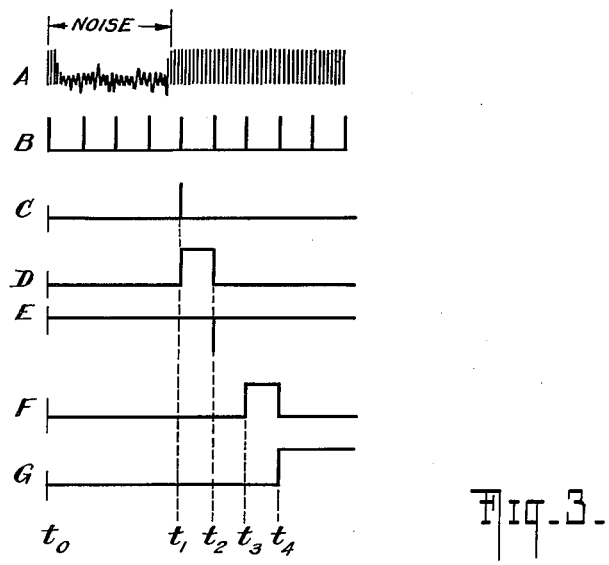
FIG. 3 is a graphical representation of the wave shapes at various stages of the programming circuit of FIG. 2.

The output from the shaping circuit 26 is shown in FIG. 3A. When the gun is fired, initially some ten or fifteen Doppler pulses are produced before the signal is obscured by the flash gases. The period during which the flash gases are emerging from the gun barrel lasts for a period of time depending on the size of the gun. For example, a 120 millimeter gun is found to have a flash gas dissipation time of approximately .20 second, while a 90 millimeter gun has a flash period of .15 second. During this interval only a noise signal is present at the receiver antenna and no Doppler pulses are produced. After the flash gases have dissipated the Doppler pulses are continuously produced until the projectile passes out of the range of the Doppler radar.

The initial ten or fifteen Doppler pulses are not sufficient to make a velocity measurement, so that a delay must be introduced before a velocity measurement is made to permit dissipation of the flash gases. However, the initial ten or fifteen Doppler pulses are used to trigger the computer 28 by means of a delay start gate 30 connected to the output of the shaping circuit 26. The delay start gate 30 comprises a step-type integrating circuit, preferably of the type described in the above-mentioned copending application. Only ten pulses of the frequency and amplitude of the Doppler pulses from the shaping circuit will trigger the integrating-type counter of the delay start gate 30. However, random noise pulses will not actuate the delay start gate 30. Thus it acts to insure that the computer will not be prematurely triggered by periodic noise pulses or other transient signals.

On receiving at least ten Doppler pulses from the shaping circuit 26, the delay start gate 30 triggers on a programing circuit 32. The programing circuit, shown in FIG. 2 and to be hereinafter more fully described, controls the sequence of operations of the computer 28. The various outputs of the programing circuit 32 are shown in FIGS. 3D-G. When triggered by the delay start gate 30, the programing circuit 32 puts out a pedestal pulse starting at time $t_1$, the elapsed interval of time being sufficient to permit dissipation of the flash gases. The pedestal pulse is shown in FIG. 3D and is coupled to a gate 34 which passes Doppler pulses from the shaping circuit 26 for the duration of the pedestal pulse from the programing circuit 32.

The Doppler pulses passed by the gate 34 are coupled through an electronic switch 36 to a decimal counter 38 which counts the number of Doppler pulses during the interval the gate 34 is open. The decimal counter is of conventional high speed counter design, such as described in Patent No. 2,547,434, capable of counting rates up to 100,000 counts a second.

The relationship between the velocity of a moving object and the change in frequency of the reflected signal is given by the expression $$V = f_d \times \frac{c}{2f} \quad (1)$$

where $c$ is the velocity of propagation and $f$ is the frequency of the transmitted signal. Since the velocity of propagation of a wave in space is $983.6 \times 10^6$ feet per second, and the transmitter frequency is 10,000 megacycles per second, the velocity may be expressed as $v = .04918 f_d$ feet per second. Thus by counting the Doppler cycles during a time interval of .04918 second, the number of cycles counted is directly equal to the average velocity of the projectile in feet per second during this interval. The pedestal pulse put out by the programing circuit 32 is accurately controlled to have a duration of .04918 second, so that the figure appearing on the decimal counter is the average velocity of the projectile in feet per second. The chronograph apparatus thus far described is substantially identical to that described in the above-mentioned copending application.

The programing circuit 32 also couples the initial pedestal pulse to a second gate 40 which passes Doppler pulses from the shaping circuit 26 through an electronic switch 42 to a bidirectional or difference counter 44. A suitable bidirectional counter is described in Patent No. 2,656,460 and includes two inputs one producing a forward count and the other producing a reverse count. The electronic switch 42 is initially set to pass the Doppler pulses from the gate 40 to the forward input of the bidirectional counter 44. Thus at time $t_2$, corresponding to the end of the first pedestal pulse of FIG. 3D from the programing circuit 32, a count is established on the decimal counter 38 and on the bidirectional counter 44 corresponding to the average velocity of the projectile during the time interval $t_2 - t_1$.

At the time $t_2$, the programing circuit puts out a pulse, as shown in FIG. 3E, which is coupled to the electronic switch 36 and the electronic switch 42. At a result the electronic switch 42 then couples the output of the gate 40 to the reverse count input of the bidirectional counter 44. At a time $t_3$, the programing circuit 32 puts out a second pedestal pulse of the same time duration as the first pedestal pulse, as shown in FIG. 3F, which is coupled to the gate 40. A second group of Doppler pulses are passed by the gate 40 from the shaping circuit 26 to the reverse count input of the bidirectional counter 44. At a time $t_4$, corresponding to the end of the second pedestal pulse, the gate 40 is closed and the count on the bidirectional counter 44 is equal to the difference between the number of Doppler pulses occurring during the first pedestal pulse from time $t_1$ to $t_2$ and the number of Doppler pulses occurring during the second pedestal pulse from time $t_3$ to $t_4$.

A source of correcting pulses, indicated at 46, is provided in the computer 28, the output from the pulse source 46 being connected through a relay 48 and a gate 50 in series, and through the electronic switch 36 to the decimal counter 38. The gate 50 is opened by the programing circuit 32 at time $t_4$, as indicated in FIG. 3G. The relay 48 is actuated by the bidirectional counter 44, in a manner hereinafter to be more fully described, such that the relay 48 is open-circuited whenever the bidirectional counter 44 is in its zero condition. However, when any count exists on the bidirectional counter 44, the relay 48 is closed, passing correction pulses from the pulse source 46 to the gate 50. Thus at the end of the second pedestal pulse with a difference count existing on the bidirectional counter 44, the relay 48 passes pulses from the pulse source 46 through the now open gate 50 to the electronic switch 36 which has been triggered by the programing circuit 32, as mentioned above, to pass the correcting pulses to the decimal counter 38.

At the same time the correcting pulses passed by the gate 50 are coupled to an adjustable pulse divider 52 which puts out pulses in any desired fractional ratio to the number of input pulses. A suitable circuit which can be used as such a divider is the conventional ring counter circuit, or the well known shifting register type circuit. The output of the divider 52 is coupled to the difference counter 44, the output pulses from the divider 52 triggering the bidirectional counter 44 to reduce its count back to zero and close the relay 48. As will hereinafter be more fully appreciated, by making the ratio of counts produced by the divider 52 equal to the ratio $$\frac{t_1 + \frac{t_2}{2}}{t_3 + \frac{t_2 + t_4}{2}}$$

the resulting count on the decimal counter 38 is made equal to the initial velocity of the projectile in feet per second.

Figure 4:
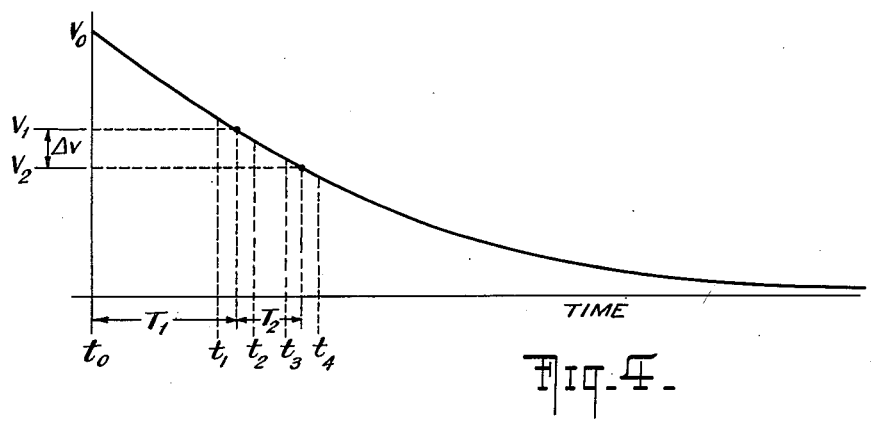
FIG. 4 is a graphical representation of projectile velocity as a function of time, with the timing intervals superimposed.

The operation of the computer can best be understood by reference to FIG. 4 which shows a graphical plot of the velocity of the projectile as a function of time. The projectile starts out with initial velocity of $V_0$. At the end of an interval $T_1$ its velocity has dropped to a value $V_1$ and at the end of a second interval $T_2$ its velocity has dropped to a value $V_2$. It will be apparent that if the change in velocity over the combined periods $T_1 + T_2$ is substantially linear then the amount that must be added to the velocity $V_1$ to get the initial velocity $V_0$, an amount designated X, will be given by the proportionality equation $$\frac{X}{\Delta V} = \frac{T_1}{T_2} \quad (2)$$

where $\Delta V$ is the change in the velocity from $V_1$ to $V_2$.

In the computer as described above, the value of $V_1$ in feet per second is recorded on the decimal counter during the interval from $t_1$ to $t_2$. As indicated in FIG. 4, the average velocity $V_1$ occurs at the center of this interval, corresponding to the indicated time interval $T_1$ after the gun is fired. The value of $V_1$ is also recorded on the bidirectional counter 44 during the interval from $t_1$ to $t_2$ with the reverse count corresponding to $V_2$ being applied during the interval from $t_3$ to $t_4$, giving a net count equal to $\Delta V$ on the bidirectional counter.

Correcting pulses are then applied through the divider 52 to the bidirectional counter 44. It will be appreciated from Equation 2 above that, if the divider 52 produces output pulses in the ratio to input pulses of $T_2$ to $T_1$, then when $\Delta V$ corrective pulses have been coupled to the bidirectional counter 44, returning it to zero, the number of corrective counts added to the decimal counter 38 will be equal to the quantity X, so that the final count on the decimal counter will be equal to $V_1 + X$, or the muzzle velocity $V_0$ of the gun.

Figure 2:
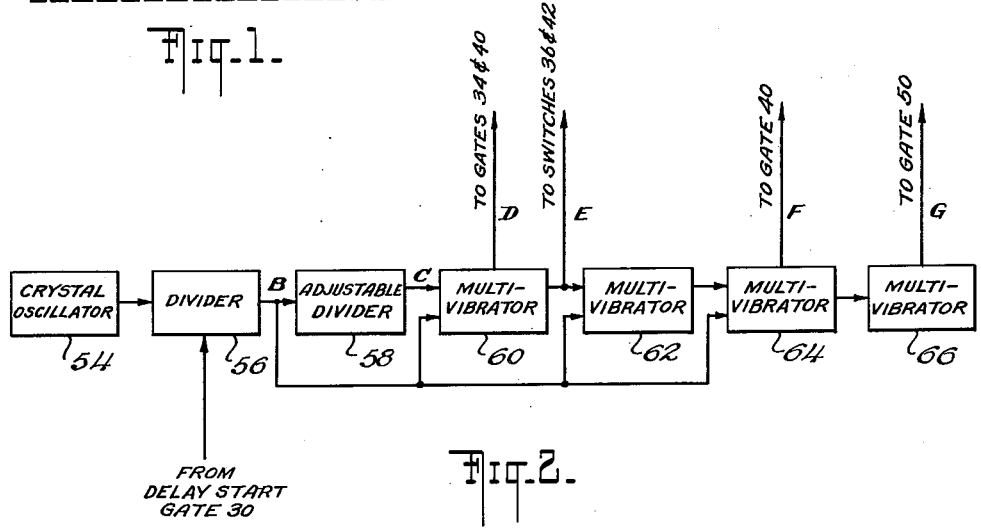
FIG. 2 is a block diagram of the component parts of the programming circuit of FIG. 1.

The programing circuit 32 is shown in more detail in FIG. 2 and includes a crystal oscillator 54 having a nominal frequency of 100 kc., for example, the output of the oscillator being coupled to a frequency divider circuit 56. The divider 56 preferably includes five free-running type blocking oscillator stages having natural frequencies of 50 kc., 10 kc., 2 kc., 400 cycles and 80 cycles per second, respectively. Each stage is synchronized by the previous stage with the input stage being controlled by the crystal oscillator. Two additional binary stages reduce the frequency to 40 and 20 cycles per second respectively, giving a time period for one cycle of nominally .05 second at the output of the divider 56. Actually, the frequency of the crystal oscillator is set to give a time period of the desired .04918 second at the output of the divider 56. The waveform of the output of the divider 56 is shown in FIG. 3B. The divider 56 is biased into operating condition by the input from the delay start gate 30, in the manner more fully described in the above-mentioned copending application.

The output from the divider 56 is coupled to an adjustable divider 58, which preferably is a four-stage binary counter. Each stage is a conventional bistable multivibrator circuit including two triodes which alternately conduct and are capable of producing an output pulse for each two pulses applied to the input. In the fourth stage, however, the input is applied to only one of the grids so that successive pulses into the fourth stage do not cause the two triodes to alternately conduct. The result is a single output pulse regardless of the number of input pulses, provided the initial conductive condition is properly established. Although a maximum time delay of .40 second or one pulse out for every eight pulses in, is possible, a shorter delay period is achieved in conventional manner by changing the initial conducting arrangement of the counter stages. FIG. 3C shows the output waveform of the divider 58 when it is set for a .20 second time delay, which is one pulse out after four pulses in.

The output of the adjustable divider 58 is coupled to a bistable multivibrator 60, the output pulse from the divider 58 triggering the multivibrator 60 to one of its stable conditions. One side of the multivibrator 60 is connected to the gates 34 and 40. The next pulse from the divider 56 following the output from the divider 58 is coupled to the multivibrator 60 returning it to its initial condition and closing the gates 34 and 40. The output from the multivibrator 60 is the pedestal pulse shown in FIG. 3D.

The multivibrator 60, when it is triggered to its initial condition by the output from the divider 56 passes an output pulse, as shown in FIG. 3E along to a second multivibrator 62 and also to the electronic switches 36 and 42, changing the condition of the electronic switches in the manner above described. The multivibrator 62 on being returned to its initial condition by the next pulse out from the divider 56 triggers a third multivibrator 64, changing its stable condition. One side of the multivibrator 64 is connected to the gate 40 so as to open the gate 40 when triggered from the multivibrator 62. The next output pulse from the divider 56 triggers the multivibrator 64 back to its initial condition, closing the gate 40. The output waveform of the multivibrator 64 to the gate 40 is shown in FIG. 3F.

The multivibrator 64 in turn is coupled to a fourth multivibrator 66, changing its stable condition. One side of the multivibrator 66 is connected to the gate 50, so that when the multivibrator 66 is triggered from the multivibrator 64, the gate 50 is opened. The output of the multivibrator 66 is shown in FIG. 3G. The multivibrator 66 is returned to its initial condition by appropriate reset means, utilized in conventional manner to reset all of the various multivibrator stages throughout the various circuits of the computer before a subsequent reading is made.

Figure 5:
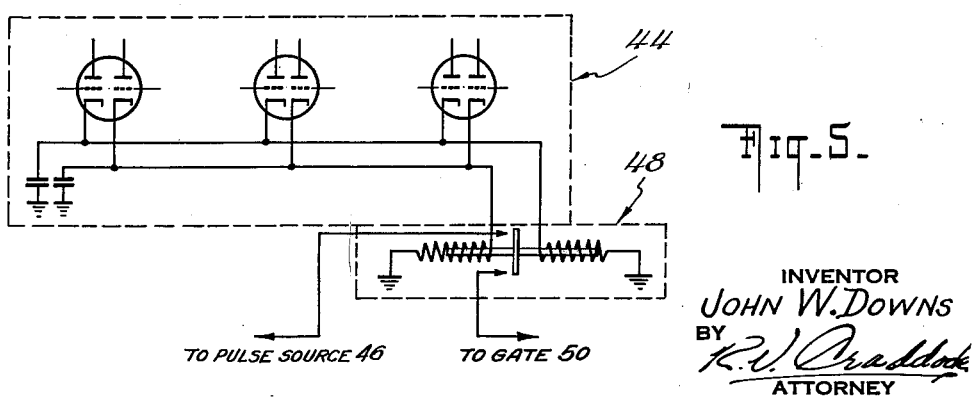
FIG. 5 is a schematic diagram of a portion of the computer.

All of the circuits shown in block form in FIGS. 1 and 2 as above described are well known in the digital computer art. The relay 48 is preferably a push-pull type of relay as shown in FIG. 5. The relay coils are preferably connected to the bidirectional counter 44 as shown. The bidirectional counter includes a plurality of binary stages each including a pair of triodes or pentodes having their cathodes connected to ground. The counter may be modified for the present invention such that the cathodes of each of the tubes of the corresponding side of each binary stage are connected together to one coil of the push-pull relay and the cathodes of the other side of each binary stage are connected together to the other coil of the push-pull relay. In the zero condition for the bidirectional counter one side of each binary stage is conducting, putting a maximum current through one of the coils of the push-pull relay and a minimum current through the other coil of the push-pull relay, holding the relay in one position. As soon as a count is established on the bidirectional counter the amount of current through the one coil will be reduced by at least the current through the tube of one stage while the current in the other coil will be increased by at least the same amount. Any such incremental change in the current through the two coils is sufficient to actuate the relay, completing the circuit between the pulse source 46 and the gate 50.

From the above description, it will be seen that the various objects of the invention have been achieved by the provision of a Doppler radar chronograph for measuring the muzzle velocity of a projectile. Although actual velocity measurements are taken at points in the trajectory remote from the gun, the computer circuit automatically converts the actual velocity measurements to muzzle velocity. The computer can be readily set to operate with a wide variety of guns by proper setting of the two dividers, namely, the dividers 52 and 58, which may be linked for simultaneous setting from a single control. Where the flash dissipation time is relatively short, a one-to-one ratio of $T_1$ to $T_2$ can be used, in which case the divider 52 is by-passed. It is desirable for the sake of accuracy that the ratio be kept as near unity as possible, within the limits imposed by the range of the radar, the flash dissipation time, and linearity of the trajectory within the total measuring time.

Since many changes could be made in the above construction and many widely different embodiments of this invention could be made without departing from the scope thereof, it is intended that all matter contained in the above description or shown in the accompanying drawings shall be interpreted as illustrative and not in a limiting sense.

What is claimed is:

1. A Doppler chronograph for measuring the muzzle velocity of a projectile, comprising means for transmitting and receiving a continuous microwave signal, means coupled to the receiver for generating a series of Doppler pulses at a repetition frequency proportional to the difference frequency between the transmited and received microwave signals, a high speed decimal counter, a first gate coupling the Doppler pulses to the decimal counter, a bidirectional counter including a forward count input and a reverse count input, a pulse source, a second gate coupling the output of the pulse source to the decimal counter, a third gate coupling the Doppler pulses to the forward count input of the bidirectional counter, a relay in series with the second gate for interrupting the flow of pulses from the pulse source to the decimal counter, means for actuating the relay in response to the zero count condition of the bidirectional counter, whereby the flow of pulses to the decimal counter is interrupted when the bidirectional counter is in the zero condition, a divider coupled to the pulse source through the second gate and the relay, the output of the divider being coupled to the reverse input of the bidirectional counter, the divider producing output pulses at a predetermined ratio in number of pulses to the input pulses, a source of clock pulses including a crystal-controlled oscillator, means actuated in response to the clock pulse source for opening the first and third gates simultaneously a predetermined number of clock pulses after the gun is fired, the first and third gates passing Doppler pulses for a fixed time interval, means actuated in response to the clock pulse source for opening the third gate again a predetermined number of clock pulses after the first opening of the third gate, the third gate passing Doppler pulses for a fixed time interval, means actuated in response to the clock pulse source for opening the second gate with the second closing of the third gate, first switching means for selectively connecting the decimal counter to the output from the first gate and output of the second gate, second switching means selectively coupling the output of the third gate to the forward input of the bidirectional counter and the reverse input of the bidirectional counter, and means for actuating the first and second switching means following the first opening of the first and second gates.

2. A Doppler chronograph for measuring the muzzle velocity of a projectile, comprising means for transmitting and receiving a continuous microwave signal, means coupled to the receiver for generating a series of Doppler pulses at a repetition frequency proportional to the difference frequency between the transmitted and received microwave signals, counting means, a first gate coupling the Doppler pulses to the counting means, a bidirectional counter including a forward count input and a reverse count input, a pulse source, a second gate coupling the output of the pulse source to the counting means, a third gate coupling the Doppler pulses to the forward count input of the bidirectional counter, means in series with the second gate for interrupting the flow of pulses from the pulse source to the counting means, means for actuating said pulse interrupting means in response to the zero count condition of the bidirectional counter, whereby the flow of pulses to the counting means is interrupted when the bidirectional counter is in the zero condition, a divider coupled to the pulse source through the second gate and the said pulse interrupting means, the output of the divider being coupled to the reverse input of the bidirectional counter, the divider producing output pulses at a predetermined ratio in number of pulses to the input pulses, a source of clock pulses, means actuated in response to the clock pulse source for opening the first and third gates simultaneously a predetermined number of clock pulses after the gun is fired, the first and third gates passing Doppler pulses for a fixed time interval, means actuated in response to the clock pulse source for opening the third gate again a predetermined number of clock pulses after the first opening of the third gate, the third gate passing Doppler pulses for a fixed time interval, means actuated in response to the clock pulse source for opening the second gate with the second closing of the third gate, first switching means for selectively connecting the counting means to the output from the first gate and output of the second gate, second switching means selectively coupling the output of the third gate to the forward input of the bidirectional counter and the reverse input of the bidirectional counter, and means for actuating the first and second switching means following the first opening of the first and second gates.

3. A Doppler chronograph for measuring the muzzle velocity of a projectile, comprising means for transmitting and receiving a continuous microwave signal, means coupled to the receiver for generating a series of Doppler pulses at a repetition frequency proportional to the difference frequency between the transmitted and received microwave signals, counting means, a bidirectional counter including a forward count input and a reverse count input, a pulse source, a clock pulse source triggered in response to the firing of the projectile, means actuated in response to a first predetermined number of clock pulses for coupling the Doppler pulses simultaneously to the counting means and the forward count input of the bidirectional counter during an interval between successive clock pulses, means actuated in response to a second predetermined number of clock pulses for coupling the Doppler pulses to the reverse count input of the bidirectional counter during an interval between successive clock pulses, means including a divider for coupling pulses from said pulse source to the counting means and the reverse input of the bidirectional counter in a predetermined ratio, and means coupled to the bidirectional counter for interrupting the output of said pulse source in response to a zero condition on said bidirectional counter.

4. A Doppler chronograph for measuring the muzzle velocity of a projectile, comprising means for transmitting and receiving a continuous microwave signal, means coupled to the receiver for generating a series of Doppler pulses at a repetition frequency proportional to the difference frequency between the transmitted and received microwave signals, counting means, a bidirectional counter including a forward count input and a reverse count input, means for producing a first train of pulses, means for producing a second train of pulses, the number of pulses during a given interval occurring in the second train of local pulses being in fixed predetermined ratio to the number of pulses during said given interval occurring in the first train of local pulses, a clock pulse source triggered in response to the firing of the projectile, means actuated in response to a first predetermined number of clock pulses for coupling the Doppler pulses simultaneously to the counting means and the forward count input of the bidirectional counter during an interval between successive clock pulses, means actuated in response to a second predetermined number of clock pulses for coupling the Doppler pulses to the reverse count input of the bidirectional counter during an interval between successive clock pulses, means for coupling said first train of pulses to the counting means, means for coupling the second train of pulses to the reverse count input of the bidirectional counter, and means coupled to the bidirectional counter for interrupting said first and second train of pulses in response to a zero condition of said bidirectional counter.

5. A computer for determining the initial velocity of a fired projectile from Doppler frequency measurements made at points along the projectile trajectory remote from the point of firing, said computer comprising means for converting the Doppler frequency measurements into Doppler pulses at a varying repetition frequency proportional to the projectile velocity, a local pulse source for generating correcting pulses, pulse counting means, a first gate for coupling the Doppler pulses to the pulse counting means, a second gate for coupling the correcting pulse output of the local pulse source to the pulse counting means, first switching means interposed between the first and second gates and the pulse counting means for selectively connecting the Doppler pulses and the correcting pulses to the counting means, bidirectional pulse counting means having a forward count input and a reverse count input, a third gate for coupling the Doppler pulses to the bidirectional counting means, second switching means interposed between the third gate and the respective inputs of the bidirectional counting means for selectively connecting the Doppler pulses to the forward input and the reverse input of the bidirectional counting means, means in series with the output of the local pulse source and the second gate and coupled to the bidirectional counting means, said last-named means being responsive to the zero condition of the bidirectional counting means to interrupt the output of the local pulse source when the bidirectoinal counter is in the zero condition, a divider circuit coupled to the local pulse source by the second gate and said pulse interrupting means, the output of the divider circuit being coupled to the reverse input of the bidirectional counting means, the divider circuit producing a predetermined ratio of output pulses to input pulses, and timing means connected to the gates and switching means, the timing means being triggered in response to the initial Doppler pulses produced at the firing of the projectile and, in sequence, opening the first and third gates after a first predetermined time interval, closing the first and third gates and triggering the first and second switching means after a second predetermined time interval, opening the third gate after a third predetermined time interval, and closing the third gate and opening the second gate after a fourth predetermined time interval, the ratio of the dividing circuit being equal to $$\frac{t_1+\frac{t_2}{2}}{t_3+\frac{t_2+t_4}{2}}$$

where $t_1$, $t_2$, $t_3$ and $t_4$ are respectively said first, second, third and fourth timing intervals.

6. A computer for determining the initial velocity of a fired projectile from Doppler frequency measurements made at points along the projectile trajectory remote from the point of firing, said computer comprising means for converting the Doppler frequency measurements into Doppler pulses at a varying repetition frequency proportional to the projectile velocity, a local pulse source for generating correcting pulses, pulse counting means, a first gate for coupling the Doppler pulses to the pulse counting means, a second gate for coupling the correcting pulse output of the local pulse source to the pulse counting means, first switching means interposed between the first and second gates and the pulse counting means for selectively connecting the Doppler pulses and the correcting pulses to the counting means, bidirectional pulse counting means having a forward count input and a reverse count input, a third gate for coupling the Doppler pulses to the bidirectional counting means, second switching means interposed between the third gate and the respective inputs of the bidirectional counting means for selectively connecting the Doppler pulses to the forward input and the reverse input of the bidirectional counting means, means in series with the output of the local pulse source and the second gate and coupled to the bidirectional counting means, said last-named means being responsive to the zero condition of the bidirectional counting means to interrupt the output of the local pulse source when the bidirectoinal counter is in the zero condition, a divider circuit coupled to the local pulse by the second gate and said pulse interrupting means, the output of the divider circuit being coupled to the reverse input of the bidirectional counting means, the divider circuit producing a predetermined ratio of output pulses to input pulses, and timing means connected to the gates and switching means, the timing means being triggered in response to the initial Doppler pulses produced at the firing of the projectile and, in sequence, opening the first and third gates after a first predetermined time interval, closing the first and third gates and triggering the first and second switching means after a second predetermined time interval, opening the third gate after a third predetermined time interval, and closing the third gate and opening the second gate after a fourth predetermined time interval.

7. A computer for determining the value at a first instant of time of a quantity that varies substantially linearly with time from the values of said quantity as determined at subsequent instants of time, where the input information fed to the computer is in digital form, said computer comprising a local pulse source for generating correcting pulses, pulse counting means, a first gate for coupling the input information pulses to the pulse counting means, a second gate for coupling the correcting pulse output of the local pulse source to the pulse counting means, first switching means interposed between the first and second gates and the pulse counting means for selectively connecting the input information pulses and the correcting pulses to the counting means, bidirectional pulse counting means having a forward count input and a reverse count input, a third gate for coupling the input information pulses to the bidirectional counting means, second switching means interposed between the third gate and the respective inputs of the bidirectional counting means for selectively connecting the input information pulses to the forward input and the reverse input of the bidirectional counting means, means in series with the output of the local pulse source and the second gate and coupled to the bidirectional counting means, said last-named means being responsive to the zero condition of the bidirectional counting means to interrupt the output of the local pulse source when the bidirectional counter is in the zero condition, a divider circuit coupled to the local pulse source by the second gate and said pulse interrupting means, the output of the divider circuit being coupled to the reverse input of the bidirectional counting means, the divider circuit producing a predetermined ratio of output pulses to input pulses, and timing means connected to the gates and switching means, the timing means being triggered at the occurrence in time of the quantity to be measured and, in sequence, opening the first and third gates after a first predetermined time interval, closing the first and third gates and triggering the first and second switching means after a second predetermined time interval, opening the third gate after a third predetermined time interval, and closing the third gate and opening the second gate after a fourth predetermined time interval, the ratio of the dividing circuit being equal to $$\frac{t_1+\frac{t_2}{2}}{t_3+\frac{t_2+t_4}{2}}$$

where $t_1$, $t_2$, $t_3$ and $t_4$ are respectively said first, second, third and fourth timing intervals.

8. A computer for determining the initial velocity of a fired projectile from Doppler frequency measurements made at points along the projectile trajectory remote from the point of firing, said computer comprising means for converting the Doppler frequency measurements into Doppler pulses at a varying repetition frequency proportional to the projectile velocity, means for generating a first train of pulses and a second train of pulses, the number of pulses in the two pulse trains during a given interval being in a fixed predetermined ratio, pulse counting means, a first gate for coupling the Doppler pulses to the pulse counting means, a second gate for coupling the first train of pulses from said generating means to the pulse counting means, first switching means interposed between the first and second gates and the pulse counting means for selectively connecting the Doppler pulses and the first train of pulses to the counting means, bidirectional pulse counting means having a forward count input and a reverse count input, a third gate for coupling the Doppler pulses to the bidirectional counting means, second switching means interposed between the third gate and the respective inputs of the bidirectional counting means for selectively connecting the Doppler pulses to the forward input and the reverse input of the bidirectional counting means, means responsive to the zero condition of the bidirectional counting means to interrupt the first and second pulse trains from said generating means when the bidirectional counter is in the zero condition, means for coupling the second pulse train output from said generating means to the reverse input of the bidirectional counting means, and timing means connected to the gates and switching means, the timing means being triggered in response to the initial Doppler pulses produced at the firing of the projectile and, in sequence, opening the first and third gates after a predetermined time interval, closing the first and third gates and triggering the first and second switching means after a second predetermined time interval, opening the third gate after a third predetermined time interval, and closing the third gate and opening the second gate after a fourth predetermined time interval, the ratio of pulse in the first and second pulse trains during a given time interval being equal to $$\frac{t_1 + \frac{t_2}{2}}{t_3 + \frac{t_2 + t_4}{2}}$$

where $t_1$, $t_2$, $t_3$ and $t_4$ are respectively said first, second, third and fourth timing intervals.

9. A computer for determining the initial velocity of a fired projectile from Doppler frequency measurements made at points along the projectile trajectory remote from the point of firing, said computer comprising means for converting the Doppler frequency measurements into Doppler pulses at a varying repetition frequency proportional to the projectile velocity, means for generating a first train of pulses and a second train of pulses, the number of pulses in the two pulse trains during a given interval being in a fixed predetermined ratio, pulse counting means, a first gate for coupling the Doppler pulses to the pulse counting means, a second gate for coupling the first train of pulses from said generating means to the pulse counting means, first switching means interposed between the first and second gates and the pulse counting means for selectively connecting the Doppler pulses and the first train of pulses to the counting means, bidirectional pulse counting means having a forward count input and a reverse count input, a third gate for coupling the Doppler pulses to the bidirectional counting means, second switching means interposed between the third gate and the respective inputs of the bidirectional counting means for selectively connecting the Doppler pulses to the forward input and the reverse input of the bidirectional counting means, means responsive to the zero condition of the bidirectional counting means to interrupt the first and second pulse trains from said generating means when the bidirectional counter is in the zero condition, means for coupling the second pulse train output from said generating means to the reverse input of the bidirectional counting means, and timing means connected to the gates and switching means, the timing means being triggered in response to the initial Doppler pulses produced at the firing of the projectile and, in sequence, opening the first and third gates after a predetermined time interval, closing the first and third gates and triggering the first and second switching means after a second predetermined time interval, opening the third gate after a third predetermined time interval, and closing the third gate and opening the second gate after a fourth predetermined time interval.

10. A computer for determining the magnitude of a variable at a first instant of time from the magnitude of said variable at subsequent instants of time, where said variable is a substantially linear function of time and the input information is fed to the computer in digital form, said computer comprising means for generating a first train of pulses and a second train of pulses, the number of pulses in the two pulse trains during a given interval being in a fixed predetermined ratio, pulse counting means, a first gate for coupling the input information pulses to the pulse counting means, a second gate for coupling the first train of pulses from said generating means to the pulse counting means, first switching means interposed between the first and second gates and the pulse counting means for selectively connecting the input information pulses and the first train of pulses to the counting means, bidirectional pulse counting means having a forward count input and a reverse count input, a third gate for coupling the input information pulses to the bidirectional counting means, second switching means interposed between the third gate and the respective inputs of the bidirectional counting means for selectively connecting the input information pulses to the forward input and the reverse input of the bidirectional counting means to interrupt the first and second pulse trains from said generating means when the bidirectional counter is in the zero condition, means for coupling the second pulse train output from said generating means to the reverse input of the bidirectional counting means, and timing means connected to the gates and switching means, the timing means, in sequence, opening the first and third gates after a predetermined time interval, closing the first and third gates and triggering the first and second switching means after a second predetermined time interval, opening the third gate after a third predetermined time interval, and closing the third gate and opening the second gate after a fourth predetermined time interval.

11. In a Doppler chronograph for measuring the muzzle velocity of a fired projectile, transmitter-receiver means for producing Doppler pulses at a varying repetition frequency proportional to the projectile velocity, a local pulse source for generating correcting pulses, pulse counting means, a first gate for coupling the Doppler pulse output of the transmitter-receiver means to the pulse counting means, a second gate for coupling the correcting pulse output of the local pulse source to the pulse counting means, first switching means interposed between the first and second gates and the pulse counting means for selectively connecting the Doppler pulses and the correcting pulses to the counting means, bidirectional pulse counting means having a forward count input and a reverse count input, a third gate for coupling the Doppler pulse output of the transmitter-receiver means to the bidirectional counting means, second switching means interposed between the third gate and the respective inputs of the bidirectional counting means for selectively connecting the Doppler pulses to the forward input and the reverse input of the bidirectional counting means, means in series with the output of the local pulse source and the second gate and coupled to the bidirectional counting means, said last-named means being responsive to the zero condition of the bidirectional counting means to interrupt the output of the local pulse source when the bidirectional counter is in the zero condition, a divider circuit coupled to the local pulse source by the second gate and said pulse interrupting means, the output of the divider circuit being coupled to the reverse input of the bidirectional counting means, the divider circuit producing a predetermined ratio of output pulses to input pulses, and timing means connected to the gates and switching means, the timing means being triggered in response to the initial Doppler pulses produced at the firing of the projectile and, in sequence, opening the first and third gates after a first predetermined time interval, closing the first and third gates and triggering the first and second switching means after a second predetermined time interval, opening the third gate after a third predetermined time interval, and closing the third gate and opening the second gate after a fourth predetermined time interval, the ratio of the dividing circuit being equal to $$\frac{t_1+\frac{t_2}{2}}{t_3+\frac{t_2+t_4}{2}}$$

where $t_1$, $t_2$, $t_3$ and $t_4$ are respectively said first, second, third and fourth timing intervals.

12. In a chronograph for measuring the muzzle velocity of a fired projectile, means for producing a train of pulses having a repetition frequency continuously proportional to the projectile velocity, pulse counting means, bidirectional pulse counting means having a forward count input and a reverse count input, means for coupling pulses from said pulse train producing means to the pulse counting means and the forward count input of the bidirectional counter during a first time interval, means for coupling pulses from said pulse train producing means to the reverse count input of the bidirectional counter during a second time interval, a pulse generator and a pulse divider, means for coupling output pulses from said generator to the pulse counting means and through said divider to the reverse input of bidirectional counter following said second time interval, and means responsive to the zero condition of the bidirectional counter for interrupting the output from the generator when the bidirectional counter is returned to the zero condition by the pulses from said generator.

13. In a chronograph for measuring the muzzle velocity of a fired projectile, means for producing a train of pulses having a repetition frequency continuously proportional to the projectile velocity, pulse counting means, bidirectional pulse counting means having a forward count input and a reverse count input, means for coupling pulses from said pulse train producing means to the pulse counting means and the forward count of the bidirectional counter during a first train interval, means for coupling pulses from said pulse train producing means to the reverse count input of the bidirectional counter during a second time interval, means for generating first and second pulse trains, means for coupling the pulse trains from said generating means respectively to the pulse counting means and the reverse input of bidirectional counter following said second time interval, and means responsive to the zero condition of the bidirectional counter for interrupting the output from said generating means when the bidirectional counter is returned to the zero condition by the pulses from said generating means.

14. A chronograph for determining muzzle velocity of a projectile fired from a gun, comprising transmitter-receiver means for producing a Doppler signal having a frequency proportional to the velocity of the projectile, means responsive to the Doppler signal for generating a first quantity proportional to the frequency of the Doppler signal after a first interval of time following the firing of the gun, means responsive to the Doppler signal for generating a second quantity proportional to the frequency of the Doppler signal after a second interval of time following the first interval of time, means for deriving a quantity equal to the difference between said first and second quantity, means for deriving a quantity equal to said difference quantity multiplied by the ratio of said first interval of time to said second interval of time, and means for adding said last mentioned quantity to said first quantity.

15. A chronograph for determining muzzle velocity of a projectile fired from a gun, comprising transmitter-receiver means for producing a Doppler signal having a frequency proportional to the velocity of the projectile, means for producing a count proportional to the frequency of said Doppler signal after a first interval of time following the firing of the gun, means for producing a count proportional to the difference in frequency of said Doppler signal after said first interval and after a second interval of time following said first interval, and means for generating a signal proportional to said difference count, the proportionality factor being equal to the ratio of the first interval to the second interval of time, and means responsive to said last-named signal for modifying the count at the end of said first interval by an amount determined by said signal.

No references cited.